(12) United States Patent
Amron

(10) Patent No.: US 7,980,423 B2
(45) Date of Patent: Jul. 19, 2011

(54) APPARATUS FOR DISCHARGING A STREAM OF FLUID

(75) Inventor: Alan Amron, Brooklyn, NY (US)

(73) Assignee: Tropical Ventures, LLC, Woodbury ( * ) Notice: Subject to any disclaimer, the term of this patent is extended or adjusted under 35 U.S.C. 154(b) by 688 days.

(21) Appl. No.: 12/069,153

(22) Filed: Feb. 7, 2008

(65) Prior Publication Data

US 2008/0290116 A1 Nov. 27, 2008
US 2010/0176150 A2 Jul. 15, 2010

Related U.S. Application Data

(63) Continuation-in-part of application No. 11/807,102, filed on May 25, 2007.

(51) Int. Cl.
*A63H 3/18* (2006.01)
(52) U.S. Cl. ............ 222/79; 446/267; 446/473
(58) Field of Classification Search ............ 222/74–75, 222/79; 446/267, 473
See application file for complete search history.

(56) References Cited

U.S. PATENT DOCUMENTS

| 1,321,099 | A | * | 11/1919 | Heyman | 222/79 |
| 2,892,289 | A | * | 6/1959 | Ryan | 446/406 |
| 5,184,756 | A | * | 2/1993 | Amron | 222/79 |
| 5,419,458 | A | * | 5/1995 | Mayer | 222/79 |
| 5,622,159 | A | * | 4/1997 | Liu et al. | 124/66 |

* cited by examiner

*Primary Examiner* — Kevin P Shaver
*Assistant Examiner* — Andrew Bainbridge
(74) *Attorney, Agent, or Firm* — Cohen Pontani Lieberman & Pavane LLP

(57) ABSTRACT

An apparatus for discharging a stream of fluid includes a water pump, a trigger mechanism, a ratchet mechanism, a fluid reservoir, and a secondary fluid chamber. A pump handle is used to move a piston that draws the fluid from the fluid reservoir into the secondary fluid chamber before discharge. The pump handle is also used to selectively connect the trigger mechanism to the ratchet mechanism to allow incremental discharge of the fluid from the secondary fluid chamber. A handle is selectively connectable to the ratchet mechanism and configured to manually move the ratchet mechanism to a first position against the urgency of the spring. The handle is also selectably connectable to a pump mechanism, the handle being movable from a first position to a second position, wherein the handle is connected to the ratchet mechanism in the first position and connected to the pump mechanism in the second position.

7 Claims, 4 Drawing Sheets

APPARATUS FOR DISCHARGING A STREAM OF FLUID

CROSS REFERENCE TO RELATED APPLICATIONS

The present invention is a Continuation-In-Part of U.S. patent application Ser. No. 11/807,102, filed May 25, 2007, the contents of which are incorporated herein by reference.

BACKGROUND OF THE INVENTION

1. Field of the Invention

The invention relates generally to a device for discharging a stream of fluid, and more particularly to a device that includes a water pump, a trigger mechanism, and a secondary fluid chamber.

2. Description of the Related Art

Various devices for discharging a stream of fluid, such as a pneumatic water gun, for example, are known. Most pneumatic water guns use air pressure to force water out of a nozzle and into the air. These types of water guns utilize one of two types of propulsion systems: a pressurized reservoir system, or a separate firing chamber system.

Water guns that use the pressurized reservoir system have a single reservoir for air and water. The reservoir is first partially filled with water, then air is forced in under pressure. When a trigger is pulled, the pressurized air forces water out of the reservoir Water guns that use the separate firing chamber system have a large reservoir for water only, and one or more smaller firing chambers. In this system, water is pumped from the reservoir into the firing chamber(s), compressing the air in the chamber(s). This exerts a force on the water, thus providing the power to push the water through the nozzle when the trigger is pulled.

SUMMARY OF THE INVENTION

In one aspect, the invention involves an apparatus for discharging a stream of fluid. The apparatus includes a fluid reservoir, a secondary fluid chamber in fluid communication with the fluid reservoir, a ratchet mechanism that includes a plurality of teeth, a piston slidably disposed in the secondary fluid chamber, and a spring. The ratchet mechanism is movable between a first position and a second position. The spring urges the ratchet mechanism toward the second position. The piston is configured to draw fluid from the fluid reservoir into the secondary fluid chamber when the ratchet mechanism is moved toward the first position and to discharge the fluid from the secondary fluid chamber during spring induced movement of the ratchet mechanism to the second position. The apparatus further includes a manually actuatable trigger mechanism that includes a pawl that interacts with the teeth and is movable from a rest position to a pulled position. The trigger mechanism is configured to arrest the spring induced movement of the ratchet mechanism in the rest position and allow the spring induced movement of the ratchet mechanism in the pulled position.

In one embodiment, the apparatus further includes a handle selectively connectable to the ratchet mechanism and configured to manually move the ratchet mechanism to the first position against the urgency of the spring.

In another embodiment, the apparatus further includes a pump mechanism in fluid communication with the fluid reservoir through a conduit.

In still another embodiment, the handle is selectably connectable to the pump mechanism. The handle is movable from a first position to a second position, and the handle is connected to the ratchet mechanism in the first position and connected to the pump mechanism in the second position to pump air into the fluid reservoir to increase pressure in the fluid reservoir.

In yet another embodiment, the apparatus further includes a one-way valve arranged between the pump mechanism and the fluid reservoir allowing a flow only from the pump mechanism toward to the fluid reservoir.

In still another embodiment, the apparatus further includes a fluid output port through which the fluid is discharged.

In another embodiment, the secondary fluid chamber comprises a one-way valve.

In yet another embodiment, a secondary fluid chamber is in fluid communication with the fluid reservoir via a hose in fluid communication with the fluid reservoir and the one-way valve.

In still another embodiment, the secondary fluid chamber is in fluid communication with the fluid output port via a hose.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters denote similar elements throughout the several views.

DETAILED DESCRIPTION OF THE PRESENTLY PREFERRED EMBODIMENTS

The invention relates to a device for discharging a stream of fluid, that includes a water pump, a trigger mechanism, a ratchet mechanism, a fluid reservoir, and a secondary fluid chamber. A pump handle is used to move a piston that draws the fluid from the fluid reservoir into the secondary fluid chamber before discharge. The pump handle is also used to selectively connect the trigger mechanism to the ratchet mechanism to allow incremental discharge of the fluid.

Figure 1:
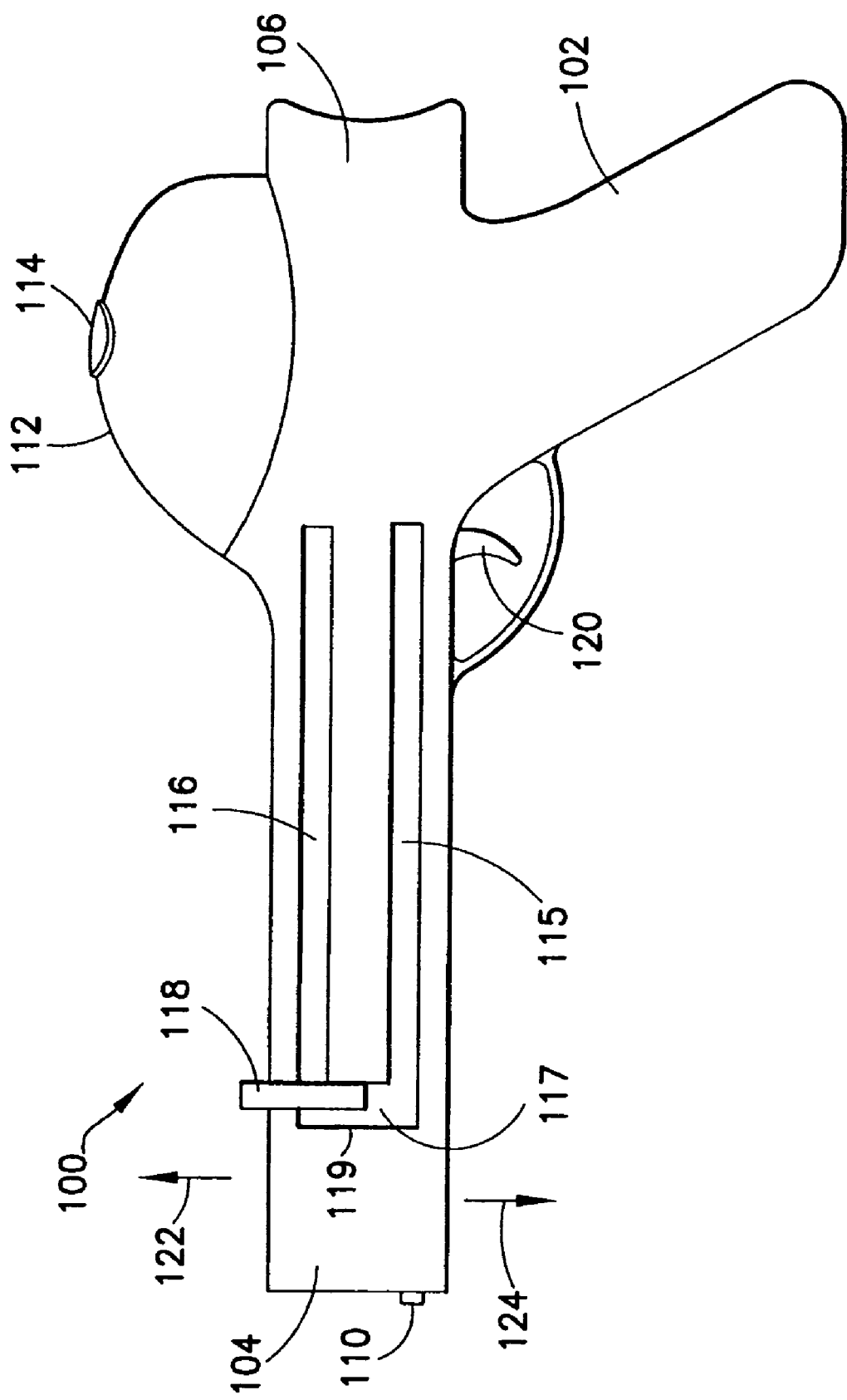
FIG. 1 is an illustrative schematic diagram of a water gun including a ratcheted pump mechanism and a trigger mechanism, according to one embodiment of the invention.

Referring to FIG. 1, in one embodiment, an illustrative schematic diagram of a water gun 100 employing a ratcheted pump handle 118 and trigger mechanism 120 is shown. The water gun 100 includes a body portion 106, a handle portion 102, a barrel portion 104, and a fluid reservoir 112 for storing a fluid, such as water, for example. The fluid reservoir 112 includes a fluid input port 114, and the barrel portion 104 includes a fluid output port 110. A "C" shaped slot 119 extends longitudinally along one side of the barrel portion 104, through which the pump handle 118 extends and couples to a pump mechanism 224 or ratchet mechanism 206 (see FIG. 2) disposed inside the body portion 106. The "C" shaped slot 119 includes an upper horizontal slot 116, a lower horizontal slot 115, and a vertical slot 117.

Figure 2A:
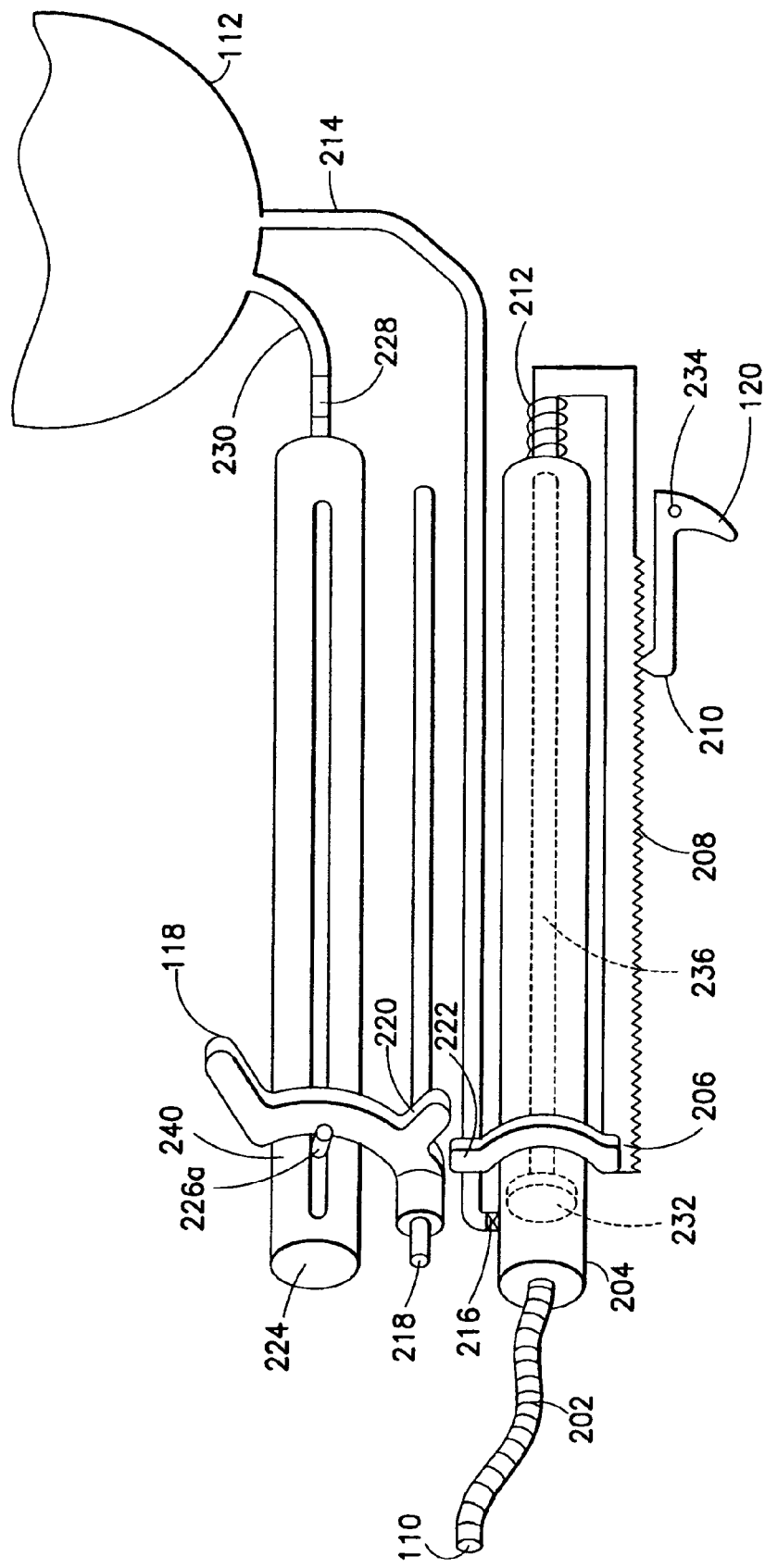
FIG. 2A in an illustrative schematic diagram of a pump mechanism, a ratchet mechanism, and a trigger mechanism disposed inside a body of a water gun in pump mode, according to one embodiment of the invention.
Figure 2B:
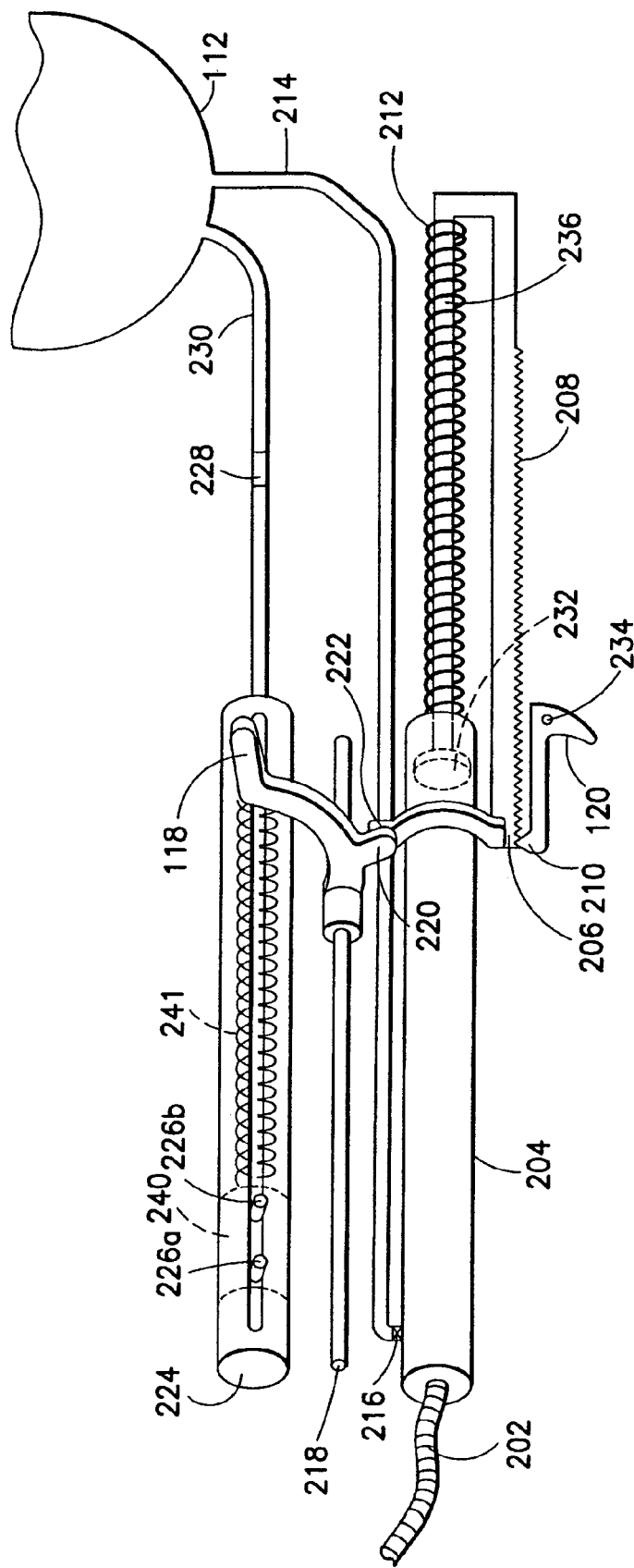
FIG. 2B in an illustrative schematic diagram of a pump mechanism, a ratchet mechanism, and a trigger mechanism disposed inside a body of a water gun in fire mode, according to one embodiment of the invention.

Referring to FIGS. 2A and 2B, in one embodiment, illustrative schematic diagrams of the a pump mechanism 224, a ratchet mechanism 206, and a trigger mechanism 120 disposed inside the body portion 106 of the water gun 100 in pump mode (FIG. 2A) and shoot mode (FIG. 2B) are shown.

The pump mechanism 224 includes a piston 240 that includes pins 226a and 226b that contact the handle 118 during pumping mode. The pump mechanism further includes a one-way valve 228. The pump mechanism 224 is in fluid communication with the reservoir 112 via a tube 230.

The ratchet mechanism 206 includes a contact portion 222 that contacts handle 118 during firing mode. The ratchet mechanism 206 further includes teeth 208, piston (or plunger) 232, piston rod 236, and spring 212. The piston 232 and piston bar 236 are slidably disposed inside a secondary fluid chamber 204, which includes a one-way valve 216 and is in fluid communication with the reservoir 112 via a hose 214. The secondary fluid chamber 204 is also in fluid communication with the fluid output port 110 via a hose 202. In another embodiment, a pressure valve is disposed between the hose 202 and the secondary fluid chamber 204 which only allows fluid to pass from the secondary fluid chamber 204 to the hose 202 if a minimum pressure is exceeded.

The handle 118 rotates on, and slides along a guide bar 218. The trigger mechanism 120 includes a pawl 210. The trigger mechanism 120 rotates on a pivot pin 234. The pawl is held to engage the teeth 208 by a spring (not shown). When the trigger 120 is pulled against the force of the spring, the pawl 210 disengages from the teeth 208.

Although the present embodiment discloses hoses or tubes for conducting fluid between the various parts of the water gun, any conduits which conduct the fluid may be used, such as channels formed in the body portion 106, the barrel portion 104, or the handle portion 102.

In one embodiment, in pump mode, the handle 118 is rotated about the guide bar 218 in an upward direction in slot 117 (in the direction shown by arrow 122 of FIG. 1) to engage the pins 226a and 226b. Instead of pins 226a and 226b, any known or hereafter developed structure which creates an engagement between the handle 118 and the piston 240 may be used. To ensure that the pins 226a and 226b or other structure remains aligned with the handle 118, a spring 241 may be arranged in the pump mechanism to urge the piston 240 in the forward position shown in FIG. 2A while the handle 118 is disengaged from the piston 240. Alternatively, another releasable mechanism may be used to hold the piston 240 in the forward position, the mechanism being released to allow pumping movement when the handle is engaged with the piston. The engagement of the handle 118 with the piston 240 causes the piston to move with the handle 118 when the handle is pulled back along slot 116. The piston 240 pumps air through the one-way valve 228 and the hose 230 into the reservoir 112. This pumping action increases the pressure in the reservoir 112. The pumping action can be executed one or more times.

After pumping has been completed, the handle 118 is moved forward to slot 117 and rotated about the guide bar 218 in a downward direction (in the direction shown by arrow 124 of FIG. 1) to contact the contact portion 222. The engagement of the handle 118 with the contact portion causes the piston 232 to move with the handle 118 when the handle 118 is pulled back along slot 115. The movement of the piston 232 draws fluid from the reservoir 112 through the hose 214 and through the one-way valve 216 and into the secondary fluid chamber 204. The piston 232 moves against the urgency of spring 212 as the piston 232 is moved out of the secondary fluid chamber 204 by the handle.

After the handle 118 has been pulled to the end of slot 115, the water gun 100 can be fired. To fire the water gun 100, a user pulls the trigger 120, which rotates on pin 234, to disengage the pawl 210 from the teeth 208 on the ratchet mechanism 206. The spring 212 urges the piston 232 into the secondary fluid chamber 204 to force the fluid through the hose 202 and through the fluid output port 110. The ratchet mechanism 206 will continue to move in response to the spring force as long as the trigger 120 is pressed and until the handle 118 moves to the end of the slot 115. Once a user stops pressing the trigger 120, the pawl 210 engages the teeth 208 and stops the ratchet mechanism 206 from moving. The user can stop and resume firing until the piston 232 is fully inserted into the secondary fluid chamber 204. Accordingly, the handle 118 does not have to be pulled all the way out to the back of the slot 115 to enable firing of the water gun.

Figure 3:
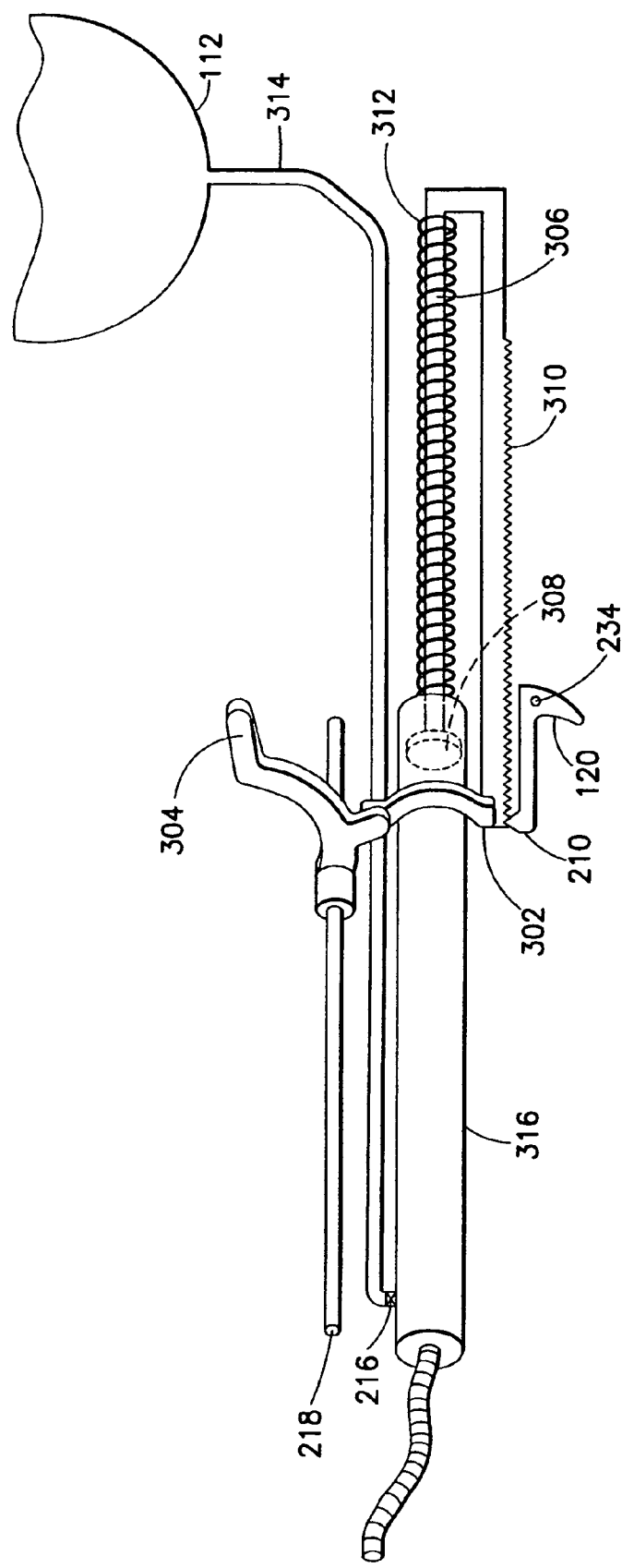
FIG. 3 in an illustrative schematic diagram of a ratchet mechanism and a trigger mechanism disposed inside a body of a water gun, according to another embodiment of the invention.

Referring to FIG. 3, in another embodiment, an illustrative schematic diagram of a ratchet mechanism 302 and a trigger mechanism 120 disposed inside a body of a water gun is shown.

The ratchet mechanism 302 includes handle 304, teeth 310, piston (or plunger) 308, piston rod 306, and spring 312. The piston 308 and piston rod 306 are slidably disposed inside a secondary fluid chamber 316, which includes a one-way valve 216 and is in fluid communication with the reservoir 112 via a hose 314. The secondary fluid chamber 316 is also in fluid communication with fluid the output port 110 via a hose 202. As disclosed above, a pressure valve may be disposed between the hose 202 and the secondary fluid chamber 316.

The handle 304 rotates on, and slides along a guide bar 218. The trigger mechanism 120 includes the pawl 210. The trigger mechanism 120 rotates on a pivot pin 234. The pawl is held to engage the teeth 310 by a spring (not shown). When the trigger 120 is pulled against the force of the spring, the pawl 210 disengages from the teeth 310.

In this embodiment, in operation, the handle 304 is pulled back along a single slot (not shown) in the body of the water gun to move the piston 308 to draw fluid from the reservoir 112 through the hose 214 and through the one-way valve 216 and into the secondary fluid chamber 316.

After the handle 304 has been pulled to the end of the single slot, the water gun can be fired. To fire the water gun, a user pulls the trigger 120, which rotates on pin 234, to disengage the pawl 210 from the teeth 310 on the ratchet mechanism 302. The spring 312 urges the piston 308 into the secondary fluid chamber 316 to force the fluid through the hose 202 and through the fluid output port 110. The ratchet mechanism 302 will continue to move as long as the trigger 120 is pressed and until the handle 304 moves to the end of the slot. Once a user stops pressing the trigger 120, the pawl 210 engages the teeth 310 and stops the ratchet mechanism 302 from moving. The user can stop and resume firing until the piston 308 is fully inserted into the secondary fluid chamber 316. Accordingly, the handle 304 does not have to be pulled all the way out to the back of the slot 115 to enable firing of the water gun.

Variations, modifications, and other implementations of what is described herein may occur to those of ordinary skill in the art without departing from the spirit and scope of the invention. Accordingly, the invention is not to be defined only by the preceding illustrative description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. An apparatus for discharging a stream of fluid, comprising:
   a fluid reservoir;
   a secondary fluid chamber in fluid communication with the fluid reservoir;
   a ratchet mechanism comprising at least one tooth, a piston slidably disposed in the secondary fluid chamber, and a spring, the ratchet mechanism being movable between a first position and a second position, the spring urging said ratchet mechanism toward the second position, the piston being configured to draw fluid from the fluid reservoir into the secondary fluid chamber when the ratchet mechanism is moved toward the first position and to discharge the fluid from the secondary fluid chamber during spring induced movement of the ratchet mechanism to the second position;
   a manually actuatable trigger mechanism comprising a pawl that interacts with the at least one tooth and movable from a rest position to a pulled position, the trigger mechanism being configured to arrest the spring induced movement of the ratchet mechanism by interaction with the at least one tooth in the rest position and allow the spring induced movement of the ratchet mechanism in the pulled position;
   a pump mechanism in fluid communication with the fluid reservoir through a conduit; and
   a handle selectively connectable to the ratchet mechanism and configured to manually move the ratchet mechanism to the first position against the urgency of the spring, wherein the handle is selectably connectable to the pump mechanism, the handle being movable from a first position to a second position, wherein the handle is connected to the ratchet mechanism in the first position and connected to the pump mechanism in the second position to pump air into the fluid reservoir to increase pressure in the fluid reservoir.

2. The apparatus of claim 1, further comprising a one-way valve arranged between the pump mechanism and the fluid reservoir allowing a flow only from the pump mechanism toward to the fluid reservoir.

3. The apparatus of claim 1, further comprising a fluid output port through which the fluid is discharged.

4. The apparatus of claim 1, wherein the secondary fluid chamber comprises a one-way valve.

5. The apparatus of claim 4, wherein a secondary fluid chamber is in fluid communication with the fluid reservoir via a hose in fluid communication with the fluid reservoir and the one-way valve.

6. The apparatus of claim 3, wherein the secondary fluid chamber is in fluid communication with the fluid output port via a hose.

7. The apparatus of claim 1, wherein the ratchet mechanism includes a plurality of teeth and the pawl of the trigger mechanism selectively arrests movement of the ratchet mechanism by interaction by interaction with any one of the plurality of teeth.

* * * * *